Nov. 1, 1949     J. H. TRAHIN     2,487,003
RECIPROCATING ENGINE
Filed Oct. 13, 1947     2 Sheets-Sheet 1

INVENTOR.
John Henry Trahin
BY
Wilfred E. Lawson
ATTORNEY

Patented Nov. 1, 1949

2,487,003

UNITED STATES PATENT OFFICE 2,487,003

RECIPROCATING ENGINE

John Henry Trahin, Beaumont, Tex.

Application October 13, 1947, Serial No. 779,603

4 Claims. (Cl. 74—44)

This invention relates to reciprocating engines and is directed primarily to improvements in the coupling between the piston rod and the connecting rod.

The primary object of the invention is to provide an improved mechanical movement forming an operative coupling between a piston rod and a crank connecting rod whereby an increase in the movement of the connecting rod relative to the piston rod is obtained to thereby increase the mechanical advantage of the engine by increasing the throw of the engine crank.

Still another object of the invention is to provide a novel coupling mechanism between a piston rod of a reciprocating engine and the engine connecting rod whereby a differential movement is obtained between the piston rod and the connecting rod in such a manner as to make possible the employment of a crank having a throw greater than would be used in an engine wherein the usual conventional pivotal coupling at the cross head is employed.

A still further object of the invention is to provide an improved cross head construction for use in reciprocating engines or pumps where a cross head is interposed between a piston rod and a connecting rod, having an eccentric or eccentrics, forming a part of the cross head and operatively coupled with adjacent stationary parts of the engine to be turned upon reciprocatory movement of the cross head, to impart a slight additional movement to the engine connecting rod which is coupled to the eccentric over and above the movement given to the part of the cross head to which the piston rod is connected.

Other objects and advantages of the invention will become apparent as the description of the same proceeds and the invention will be best understood from a consideration of the following detailed description taken in connection with the accompanying drawings forming part of the specification, with the understanding, however, that the invention is not to be limited to the exact details of construction shown and described since obvious modifications will occur to a person skilled in the art.

Figures 1, 2:
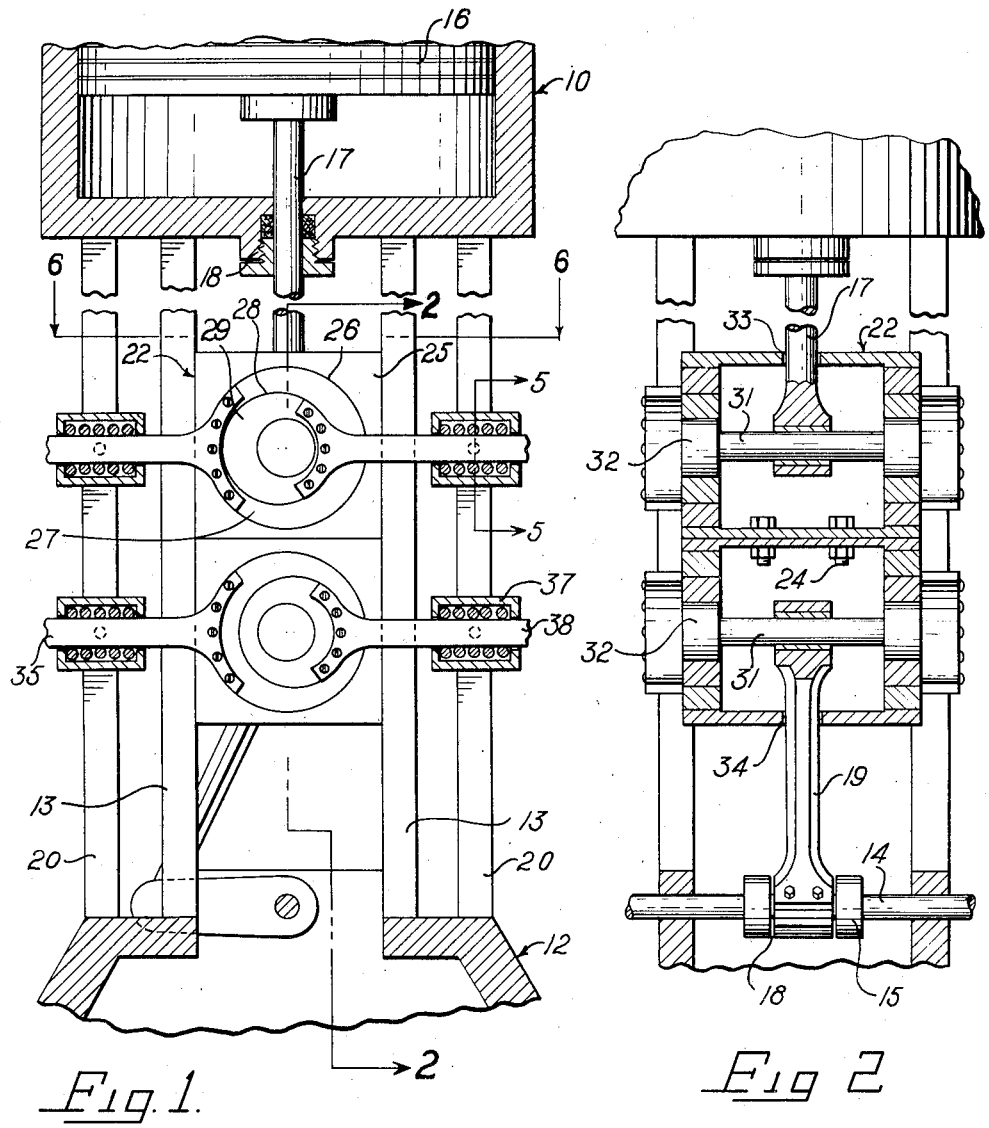
Figure 1 is a view partly in section and partly in side elevation of a vertical reciprocating engine showing incorporated therein the mechanical movement constituting the present invention.
Figure 2 is a view partly in side elevation and partly in vertical section of the same wherein the section of certain of the parts is taken substantially upon the line 2—2 of Figure 1.
Figure 5:
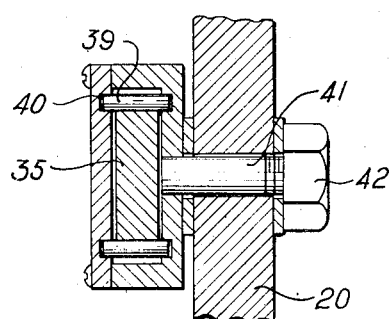
Figure 5 is a detail section taken substantially on the line 5—5 of Figure 1.

Referring now more particularly to the drawings, Figures 1 and 2 illustrate more or less conventionally parts of a vertical reciprocating steam engine, in association with which the present invention is illustrated.

While it is stated that the illustration is of a vertical reciprocating steam engine it is to be understood that the use of the invention is not to be limited to an engine of this character as it will be readily apparent to those versed in the art that the invention may be employed in connection with a pumping engine of similar construction or in connection with any mechanical structure or movement wherein reciprocating movement is translated into rotary movement or vice-versa.

In the structure illustrated the numeral 10 generally designates a piston cylinder supported above and from an engine base 12 by the vertical, spaced, parallel cross head guides 13.

The numeral 14 designates the engine crank shaft, the crank being designated 15.

Disposed within the cylinder 10 is the piston 16 which carries the rigid piston rod 17 which extends downwardly through the usual packing gland 18 for connection with the cross head structure which is slidably mounted between the cross head guides.

The piston rod 17 is in line with the axis of the crank shaft 14 and perpendicular thereto as in the usual construction and the crank pin 18 has coupled therewith one end of the connecting rod 19.

In accordance with the present invention there is provided outside of the space occupied by the cross head guides 13, a supporting means for the hereinafter described rocker bearing units, such means being here shown as in the form of four rails, each of which is designated 20. Each of these rails is adjacent to a cross head guide 13 and is spaced outwardly therefrom in a direction perpendicular to the crank shaft 14.

While reference has been made to the use of the individual rails 20 for the support of the hereinafter described rocking bearings, it is to be understood that any other suitable supporting means may be employed if desired, as for example, the cross head guides may be inclosed in a suitable housing the walls of which would then be employed for the support of the bearings.

The numeral 21 generally designates the cross head which provides the coupling between the outer end of the piston rod 17 and the connecting rod 19.

In the embodiment of the invention herein illustrated the cross head structure embodies the two units 22 which are here illustrated as being in the form of rectangular boxes which are suitably grooved or channeled along each of four parallel corners, as indicated at 23, to receive correspondingly shaped corners of the cross head guides, whereby the units 22 are maintained for sliding reciprocatory movement on and between the guides.

The units 22 of the cross head structure are here shown as hollow box like units and this construction is preferred for lightness. However, it will be readily apparent that such units may be of solid form or in the form of blocks, if desired.

The units 22 rest one upon the other as shown in Figures 1 and 2 and are secured or coupled together for unitary movement in any suitable manner as, for example, by the use of the bolts 24.

Each of the cross head units 22 has two opposite end walls 25 in the center of which is formed the circular opening 26, in which is fitted for turning movement an eccentric ring 27.

The ring 27 has the opening 28 thereof eccentrically located with respect to its periphery and within this eccentric opening is fitted the inner eccentric ring 29, the eccentric inner edge or opening 30 of which is concentric with the periphery of the outside eccentric ring 27 and is in the exact center of the end wall 25.

Extending through each unit 22 is a wrist pin 31, each end of which has the bearing head 32 which is mounted in the opening 30 of the inner eccentric ring 29. Accordingly it will be seen that the wrist pin 31 extends through the exact center of the box or unit 22.

In the construction here illustrated, the upper box unit has the top opening 33 through which the piston rod 17 extends downwardly into the unit for connection with the wrist pin 31 thereof.

The lower box unit 22 has a similar opening 34 in its bottom wall through which extends upwardly the connecting rod 19 for connection with the wrist pin 31 of the lower unit.

Each pair of eccentric rings or eccentric wedges 27 ad 29 has associated therewith a pair of rocker arms 35. One arm of each pair is connected with the inner eccentric ring or wedge 29 at the low side of the eccentric, by which is meant the side between the bearing 32 and the periphery of the inner eccentric ring where the periphery comes nearest to the bearing. The other arm 35 of the pair is secured to the outer face of the outer eccentric ring or wedge 27 at the side thereof remote from the low side of the ring 29. This description of the locations of the ends of the arms 29 applies, of course, when the arms are directly in alignment as shown in Figure 1, where the cross head is in the midway position between the upward limit and downward limit of its movement.

Each of the rocker arms 35 extends outwardly through a rocker bearing which is generally designated 36. Each of these bearings comprises a box 37 having the end aligned openings 38 for the extension of an arm through the box and rotatably mounted within the box upon opposite sides of the arm 35, here shown as the top and bottom sides, are anti-friction elements 39, here shown as roller bearings. The ends of these roller bearings are rounded or pointed as indicated at 40 and seat or engage in correspondingly shaped recesses in the opposing walls of the box so that as the arm 35 reciprocates back and forth through the bearing box the anti-friction elements will turn and therefore reduce the friction to a minimum.

Each of these boxes has secured thereto a pivot stud or trunnion 41 which passes through and is rotatable in a suitable opening in the adjacent bearing supporting rail 20, the outer end of this stud receiving a nut 42 which holds the bearing box in the desired position.

The bearing boxes or bearing units 36 are located so that when the cross head is in its midway position as previously stated, where the pairs of arms 35 are in direct alignment transversely of the cross head guides 13 and rails 20, the centers of the pivots or trunnions 46 for the boxes or bearing units will lie in the same plane as the aligned arms.

Figure 3:
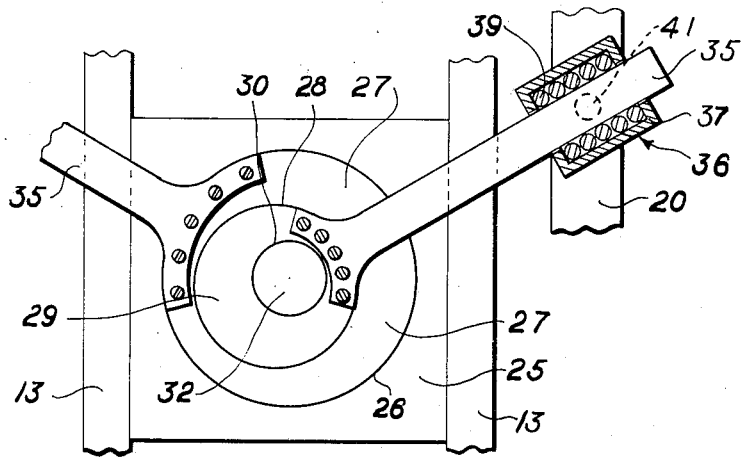
Figure 3 is a detail view on an enlarged scale of one unit or block of the cross head showing the position of the eccentric rings when the cross head is in lowered position.
Figure 4:
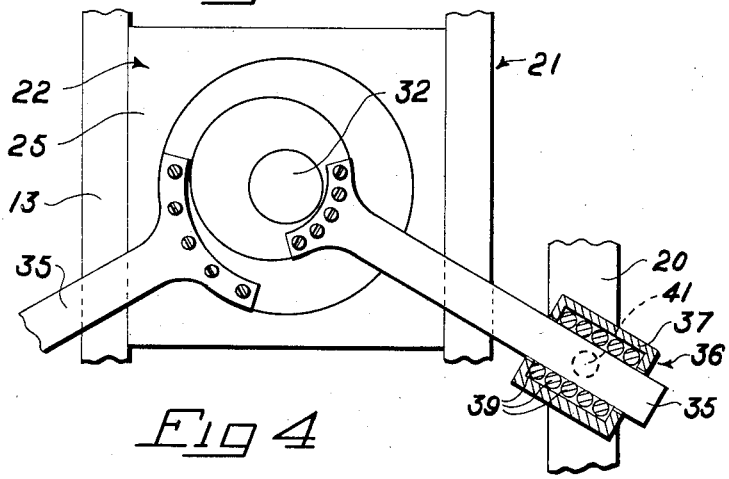
Figure 4 is a view corresponding to Figure 3, but showing the position of the eccentric rings when the cross head is in raised or elevated position.
Figure 6:
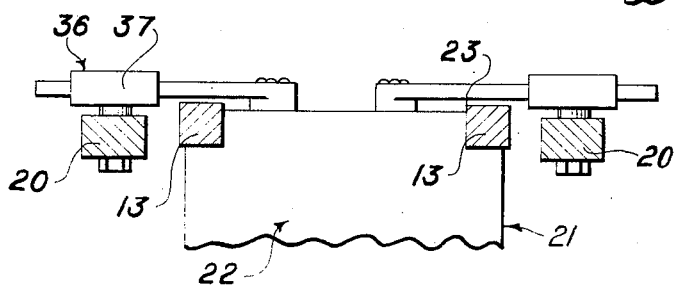
Figure 6 is a partial transverse section taken of the plane of line 6—6 of Figure 1.

In the operation of an engine of the character here illustrated, as the cross head moves up and down or reciprocates, the eccentric rings or circular wedges 27 and 29 will be turned one around the other as illustrated in Figures 3 and 4. This turning action is brought about by the engagement of the arms 35 in the pivoted bearing units or guides 36. Since the positions of these bearing guides remains fixed as regards up and down movement while the circular wedges connected to the inner ends of the arms 35 are traveling back and forth in a straight path, it will be seen that such circular wedges will be turned. While the extent of movement of the units 22 of the cross head is the same as that of the piston and piston rod 16—17, by the rotary action of the eccentrics particularly the eccentrics of the lower unit to which the connecting rod 19 is attached, the center of the wrist pin 31 which is connected with the connecting rod 19 and the piston rod 17 and units 22 will have a differential movement. Accordingly as the piston rod and cross head units 22 move down the center of the wrist pin 31 with which the connecting rod 19 is connected will move down somewhat faster because of the action of the circular wedges or eccentric rings, and accordingly the crank 15 can be of a length to have a greater throw, which is determined by the movement differential between the lower wrist pin 31 and the connecting rod 17, than would be possible if the connecting rod and piston rod were coupled to a cross head of the usual or conventional form.

With the present construction it is possible to have a crank with a 4½ inch throw operated by a piston having a 6 inch stroke. Under normal practice a 6 inch stroke piston could operate only with a crank having a 3 inch throw. Accordingly a gain of an inch and one half in the throw of the crank is obtained and consequently the mechanical advantage is greatly increased so that a greater amount of work can be accomplished with an engine constructed in accordance with the present invention or employing a cross head construction of the character herein disclosed.

While an illustration has been made of the cross head employing two separate boxes or units 22 use may be made, if desired, of a cross head employing only a single box and a pair of arms at each end. In such construction, however, the piston rod 17 would be attached directly to the top of the box or cross head unit and the connecting rod 19 would extend into the unit and be attached to the wrist pin 31. With this construction or arrangement a corresponding action would be obtained as described in connection with the use of the two cross head units shown and described.

I claim:

1. In a mechanism of the character stated, a reciprocable driven element, a member supported for rectilinear movement and operatively coupled with said element to move therewith, a rotatable crank, and a coupling between the member and crank comprising an eccentric supported on said member to turn thereon on an axis perpendicular to the line of movement of the member, means for effecting turning of the eccentric relative to the member upon rectilinear movement of the member, a connecting rod connected at one end to said crank, and a wrist pin coupling between the other end of the connecting rod and the eccentric to turn on the turning axis of the eccentric and move in a straight path with said member.

2. Mechanism for increasing the mechanical advantage in a reciprocating engine having a piston and piston rod, a rotatable crank and a connecting rod attached at one end to the crank; comprising a cross head body attached to the piston rod to reciprocate in a straight path therewith, supporting guides for the body, an eccentric element carried by the body to turn relative to the body on an axis perpendicular to the line of movement of the body, a pivot coupling between the other end of the connecting rod and the eccentric and turning on the same center as the eccentric, and means for effecting positive partial turning only of the eccentric on its axis relative to the body as the body reciprocates.

3. A mechanism of the character stated in claim 2, wherein the said means for effecting the positive partial turning of the eccentric on its axis comprises an arm secured at one end to the eccentric, a guide bearing having the arm extending therethrough, and pivot means of supporting said guide bearing at one side of the cross head body for turning on an axis paralleling the turning axis of the eccentric, the arm being slidable longitudinally through the bearing.

4. Mechanism for increasing the mechanical advantage in a reciprocating engine having a piston and piston rod, a rotatable crank and a connecting rod attached at one end to the crank; comprising cross head guides paralleling the path of movement of the piston and piston rod, a cross head body supported by said guides, the piston being attached to the body for concerted movement therewith, said cross head body having opposite end walls spaced apart in a line perpendicular to the path of movement of the piston rod, said end walls having aligned circular openings therein, the axial centers of which intersect the center line of the piston rod, a ring in each of said openings and having an eccentric opening, an eccentric ring in the eccentric opening of each of the first rings, a wrist pin extending transversely through the body and supported at each end eccentrically in an eccentric ring, the other end of said connecting rod being coupled with said wrist pin, an arm attached to each of the first rings and extending laterally therefrom away from the wrist pin, an arm attached to each of said eccentric rings and extending laterally in the opposite direction away from the wrist pin, a bearing guide for each arm and having the arm slidably extended therethrough, and a pivotal support for each bearing guide positioned laterally of the cross head body, the turning axis of the bearing guide pivots being parallel with the wrist pin and in a common plane extending perpendicular to the piston rod and lying midway between the limits of movement for the cross head body.

JOHN HENRY TRAHIN.

REFERENCES CITED

The following references are of record in the file of this patent:

UNITED STATES PATENTS

| Number | Name | Date |
|---|---|---|
| 485,557 | McMaster | Nov. 1, 1892 |
| 1,308,499 | Krutchenreiter | July 1, 1919 |
| 1,797,493 | Baxter | Mar. 24, 1931 |
| 1,988,571 | Rider | Jan. 22, 1935 |